United States Patent
Iori et al.

(10) Patent No.: US 7,035,010 B2
(45) Date of Patent: Apr. 25, 2006

(54) POLARIZED LENSES WITH VARIABLE TRANSMISSION

(75) Inventors: Giuseppe Iori, Reggio Emilia (IT); Matteo Lagasi, Bangkok (TH); Federico Menta, Parma (IT); Gian Giuseppe Giani, Parma (IT)

(73) Assignee: Intercast Europe, S.P.A., Parma (IT)

( * ) Notice: Subject to any disclaimer, the term of this patent is extended or adjusted under 35 U.S.C. 154(b) by 0 days.

(21) Appl. No.: 10/385,957

(22) Filed: Mar. 11, 2003

(65) Prior Publication Data

US 2004/0021941 A1 Feb. 5, 2004

Related U.S. Application Data

(60) Provisional application No. 60/364,449, filed on Mar. 14, 2002, now abandoned, provisional application No. 60/393,506, filed on Jul. 3, 2002.

(51) Int. Cl.
*G02B 27/28* (2006.01)
*G02B 5/30* (2006.01)

(52) U.S. Cl. ............ 359/490; 359/494; 359/485; 351/162; 351/163; 351/49; 264/1.32

(58) Field of Classification Search ............ 359/490, 359/581, 586, 241, 884, 483, 485, 494, 502; 428/412, 425.5, 447, 451, 452, 908.8, 220, 428/323; 351/162, 163, 49; 264/1.32
See application file for complete search history.

(56) References Cited

U.S. PATENT DOCUMENTS

| | | | | |
|---|---|---|---|---|
| 3,786,119 | A * | 1/1974 | Ortlieb | 264/1.32 |
| 4,170,567 | A * | 10/1979 | Chu et al. | 252/586 |
| 4,230,768 | A * | 10/1980 | Hamada et al. | 428/352 |
| 4,261,656 | A * | 4/1981 | Wu | 351/163 |
| 4,889,413 | A * | 12/1989 | Ormsby et al. | 359/241 |
| 4,977,028 | A * | 12/1990 | Goepfert et al. | 428/426 |
| 5,135,298 | A * | 8/1992 | Feltman | 351/163 |
| 5,805,336 | A * | 9/1998 | Dalzell et al. | 359/494 |
| 6,319,433 | B1 * | 11/2001 | Kohan | 264/1.32 |
| 6,723,423 | B1 * | 4/2004 | Kaneko et al. | 428/323 |
| 6,773,816 | B1 * | 8/2004 | Tsutsumi | 428/428 |
| 6,801,360 | B1 * | 10/2004 | Phillips et al. | 359/490 |
| 6,840,635 | B1 * | 1/2005 | Maeda et al. | 359/512 |
| 2002/0006505 | A1* | 1/2002 | Nishizawa et al. | 428/220 |
| 2003/0008149 | A1* | 1/2003 | Moravec et al. | 428/412 |

FOREIGN PATENT DOCUMENTS

JP 175071 A * 7/1988

* cited by examiner

*Primary Examiner*—Leonidas Boutsikaris
(74) *Attorney, Agent, or Firm*—Stroock & Stroock & Lavan LLP

(57) ABSTRACT

A lens including a polarizing film within a polyurethanic material which comprises a photochromic dye therein.

25 Claims, 2 Drawing Sheets

POLARIZED LENSES WITH VARIABLE TRANSMISSION

CROSS-REFERENCE TO RELATED APPLICATION

This application claims the benefit of U.S. Provisional Patent Application No. 60/364,449 filed on Mar. 14, 2002, and U.S. Provisional Patent Application No. 60/393,506 filed on Jul. 3, 2002, the contents of which are each hereby incorporated by reference.

FIELD OF THE INVENTION

The present invention relates to optical-quality polarized parts, and, in particular, to variable transmission polarized lenses for use in sunglasses, visors and the like.

BACKGROUND OF THE INVENTION

The present invention relates to optical-quality polarized parts, and, in particular, to variable transmission polarized lenses for use in sunglasses, visors and the like. In particular, the present invention is directed at lenses comprising a polarizing film integrally bonded within a polyurethanic material which itself comprises a photochromic compound therein.

Optical-quality eyewear requires good optical performance. In the selection of lens materials for use in optical-quality eyewear, the color, weight, and safety of the material is important, as well as good optical performance. Most often, however, the respective properties of different materials necessitate trade-offs among the desired lens characteristics. For instance, glass has very good optical properties, but it is heavy (a dense material) and only impact resistant if thick (resulting in an even heavier lens). Polymeric thermoset resins, such as CR-39, are lighter in weight but are lacking in impact resistance. Polycarbonate, in contrast, is both lightweight and highly impact resistant. Polycarbonate also has a high refractive index. Thus, thinner lenses can be made utilizing polycarbonate. However, due to lower Abbe Number, polycarbonate exhibits more chromatic aberration than glass, typically resulting in unacceptable off-axis distortion.

Polyurethanic materials have also been used as a lens material. U.S. Pat. No. 5,962,617 (Simula) and Published Patent Application No. US 2001/0028435 (Younger Optics), each of which are incorporated herein by reference, describe a polyurethanic resin material for use in lenses. This material comprises the reaction product of a pre-polymer composition and a diamine curing agent. As described in these references, this material may offer improved lens characteristics over conventional materials.

Another type of lenses are photochromic lenses. Photochromic lenses adapt their transmission to a variable light intensity by balancing colors and helping keep the brightness on the eyes constant. Photochromic lenses are also often useful when a big change of luminous intensity take place. This can happen, for example, by simply getting out of the car into the sunshine, and during open air activities such as on high mountains and at seaside resorts. Photochromic compounds, contained in a photochromic lens, exhibit a reversible change in color when exposed to light radiation involving ultraviolet rays, such as the ultraviolet radiation in sunlight or the light of a mercury lamp. Various classes of photochromic compounds have been synthesized for use in applications in which a sunlight-induced reversible color change or darkening is desired. The most widely described classes of photochromic compounds are spyrooxazines, spyro-pyrans and fulgides.

The general mechanism responsible for the reversible change in color, i.e., a change in the absorption spectrum in the visible range of light (400–700 nm) exhibited by different types of photochromic compounds has been described and categorized. See John C. Crano, "Chromogenic Materials (Photochromic)", Kirk-Othmer Encyclopedia of Chemical Technology, Fourth Edition, 1993, pp. 321–332, incorporated herein by reference. The general mechanism for the most common classes of photochromic compounds involves an electronic mechanism causing the transformation of a colorless open ring form into a colored closed ring form.

In the aforedescribed mechanisms, the photochromic compounds require an environment in which they can reversibly transform. In solid polymer matrices, the rates at which the photochromic processes of activation, i.e., formation of color or darkening, and fading, i.e., the return to the original or colorless state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183–190, incorporated herein by reference. One of the main obstacles reported by Claus D. Eisenbach, for the larger commercial application of photochromic systems, is the slow rate of photochromic activation and fade in a solid polymer matrix.

The use of photochromic compounds in polyurethanes to produce optical articles has been described in U.S. Published Patent Application 2001/0050356, and references cited therein, which are each incorporated herein by reference.

Polarized lenses and visors are widely used for glare reducing optical devices and are especially suitable for sport activities taking place outdoors, generally in snow, water and sand environments. Polarized lenses are also highly appreciated for driving activity because they can reduce glare and provide better vision of the automobile instrumentation panel as well as the roadway Generally, polarized lenses are obtained by bonding a polarized film onto the plastic lens surface or introducing such film into the plastic material during the polymerization. Regardless of which particular material is used for the lens body, it is preferable in many applications to incorporate a polarizing film into the lens. However, while polarizing films have been used in combination with many of the prior art lens body materials, none of the photochromic polyurethanes disclosed in the prior art teach or even suggest the use of a polarizing film in combination with the photochromic polyurethanes.

Accordingly, there is a need in the field for lenses which are both polarized to reduce the glare and which provide the wearer with a variable perception depending on the light variation. The present invention overcomes shortcomings of the prior art and is directed at the use of photochromic compounds in a polyurethanic material incorporating a polarizing film.

SUMMARY OF THE INVENTION

The present invention relates to polarized lenses, and, in particular, to polarized lenses for use in sunglasses, which provide the wearer with a variable perception depending on the light variation. In particular, the present invention is directed at lenses comprising a polarizing film within a polyurethanic material which comprises a photochromic dye therein. The present invention is also directed towards methods of making such lenses.

Other objects and features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative.

DETAILED DESCRIPTION OF THE PRESENTLY PREFERRED EMBODIMENTS

The present invention relates to polarized lenses, and, in particular, to polarized lenses for use in sunglasses, which provide the wearer with a variable perception depending on the light variation. In particular, the present invention is directed at lenses comprising a polarizing film within a polyurethanic material which itself comprises a photochromic dye therein.

Figure 1:
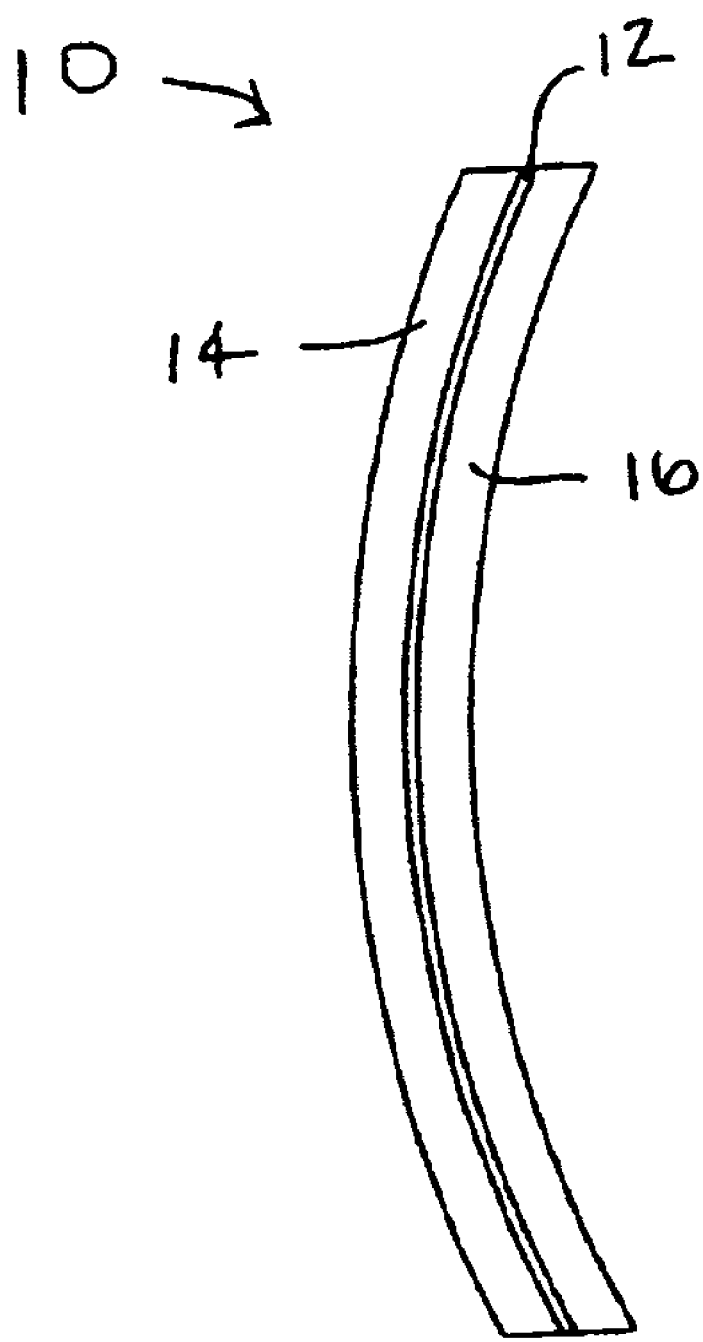
FIG. 1 is a cross sectional view of a lens constructed in accordance with one aspect of the present invention.

A seen in FIG. 1, the present invention is directed at an optical part, generally indicated as 10, comprising a polarizing film 12 covered on its front and back sides by a polyurethanic material 14 and 16, respectively. In a preferred embodiment, the polyurethanic material comprises a photochromic dye therein.

The present invention is not limited to lenses for use in glasses, or sunglass lenses in particular, but rather the term lens as used herein and in the claims shall be interpreted in its broadest sense to include any type of eye-protecting element or device used to protect or shield the eyes of a wearer, such as, for example, lenses, frames, filters, sunglasses, fashion eyewear, sport eyewear, eyeglasses, ophthalmic lenses, visors, shields, face shields, goggles, and the like (as those terms are customarily used in the eyewear industry).

The polyurethanic material or resin suitable for use in the lenses of the present invention is preferably an elastomer resin such as those described in the U.S. Pat. No. 5,962,617, U.S. Pat. No. 6,127,505, U.S. 2001/0050356, and U.S. 2001/0028435, each of which are incorporated herein by reference, or similar materials obtained mainly by a procedure called the "prepolymer method". The prepolymer method consist of preparing a prepolymer containing free—NCO groups by reaction of a diisocyanate with a slightly less than stoichiometric quantity of long and/ or short chain polyols. The polyurethane elastomer is then obtained by reacting the prepolymer (also commercially available) with a curative, such an aromatic amine or a short chain polyol, which is linked to the excess of free—NCO groups. This raw material is then poured into an appropriate glass or metal mold and left to polycondensate through a suitable time/temperature cycle.

For improved optical product performance (such as resistance to sunlight, heat discoloration and color variation), the polyurethanic material may be modified with the addition of commonly used additives like heat stabilizers, antioxidants, mold release agents and static (non-photochromic) dyes. Such additives are typically added to the prepolymer in amount less than 3% weight. Moreover, in a preferred embodiment, to obtain an eye protection to the UV rays up to 380 nm, a UV Absorber like TINUVIN 326 is added in a ratio of less than 0.1% by weight.

The polarizing film of the present invention is preferably a commercially available film such as PVA films or polyethylene terephthalate (PET) films, such as those described in U.S. Pat Nos. 5,882,774; 6,096,375, and 5,867,316, and references respectively cited therein, all of which are incorporated herein by reference.

Such polarizing films can also be laminated for protection on one side or both sides with plastic films like cellulose triacetate or acetobutyrrate or polycarbonate and other suitable transparent plastic materials. In a preferred embodiment, the final thickness of such polarized films can range from about 0.2 to 0.8 mm.

In a preferred embodiment, the polarizing film is between about 0.2 mm to 0.4 mm thick and has a degree of polarization sup. to 90% (to comply with European Standard EN 1863). This kind of film is commercially available and generally used in LCD display construction.

The polyurethanic material of the present invention is made photochromic by incorporating a few percent of a single photochromic or a mixture of photochromic dyes.

The photochromic compounds may include naphthopyrans, benzopyrans, indenonaphthopyrans, phenanthorpyrans, spiro(benzindoline)naphthopyrans, spiro(indoline)benzopyrans, spiro(indoline)naphthopyrans, spiro(indoline)quinopyrans, spiro(indoline) pyrans, spiro(indoline)naphthoxazines, spiro(indoline)pyridobenzoxazines, spiro(benzindoline)pyridobenzoxazines, spiro(benzindoline)naphthoxazines, spiro(indoline)benzoxazines, mercury dithizonates, fulgides, fulgimides and mixtures of such photochromic compounds. Such photochromic compounds are described in U.S. Pat. Nos. 5,645,767 and 6,153,126, which are each incorporated herein by reference.

The photochromic compounds may be incorporated into the polyurethanic composition by various methods described in the art. Such methods include mixing the photochromic compounds with the prepolymer or with one of the materials used to form the prepolymer; with the curative and/or to the mixture of reactants in the one shot production process so that the photochromic compounds are cast in place when the composition is cured.

Another method is to imbibe the lens surface by dipping it in a hot solution of the photochromic compound(s) or by thermal transfer in which the photochromic compound(s) are provided as a separate layer, e.g., as a part of a polymeric film, which is thermally heated until the required amount of photochromic compound(s) is transferred. In such methods, the photochromic compounds may be dissolved and/or dispersed in an aqueous or organic solvent prior to being imbibed into the resin composition. The term "imbibition" or "imbibe" is intended to mean and include permeation of the photochromic compound(s) alone into the polymerizate, solvent assisted transfer of the photochromic compound(s) into a porous polymer, vapor phase transfer, and other such transfer mechanisms.

The amount of the photochromic compounds to be incorporated into the polyurethanic resin composition is not critical provided that a sufficient amount is used to produce a photochromic effect discernible to the naked eye upon activation. The particular amount used depends often upon the intensity of color desired upon irradiation thereof and upon the method used to incorporate the photochromic compounds. Typically, the more photochromic compound incorporated, the greater is the color intensity up to a certain limit.

The relative amounts of the aforesaid photochromic compounds used will vary and depend in part upon the relative intensities of the color of the activated species of such compounds, the ultimate color desired and the method of incorporation into the host material or substrate. In a preferred embodiment, the polyurethanic material of the present invention is made photochromic by incorporating a few percent of a single photochromic or a mixture of photochromic dyes therein. Generally, the amount of total photochromic compound incorporated into the polyurethanic resin composition may range from about 0.05 to about 2.0% by weight of the resulting polyurethanic resin.

Photochromic articles prepared from the polyurethanic resin composition of the present invention may be coated with an organic hard coating material of the ultraviolet curable, so as to form a hard surface layer, whereby the surface hardness is enhanced. Application of such protective coatings, e.g., abrasion resistant coatings, may be by any of the methods used in coating technology such as, for example, spray coating, spin coating, spread coating, curtain coating, dip coating or roll-coating. Other coatings and/or surface treatments, e.g., a tintable coating, hydrophobic coating, etc., may also be applied individually or sequentially to at least one surface of the photochromic articles of the present invention. An antireflective coating, e.g., a monolayer or multilayer of metal oxides, metal fluorides, or other such materials, may be deposited onto the photochromic articles, e.g., lenses, of the present invention through vacuum deposition, sputtering, or some other method.

The present invention is also directed towards methods of making such lenses. The exemplary manufacturing processes may yield a finished part ready for an intended optical application. Alternately, it may yield an optical part in preparation for further processing into another shape or for incorporation into a larger instrument or system. For example, the processes described below illustrates steps that can be used to form a finished polarized lens ready for final insertion into a eyeglass frame, helmet or goggle; a prescription or non-prescription polarized lens blank to be edged to final shape and inserted into a frame; or a semi-finished polarized lens blank that must be surfaced, polished and edged to a final prescription and shape before being inserted into frames. Similarly, optical parts for displays or windows could be prepared to final shape and size, or manufactured via the process described below as large parts that are subsequently cut, shaped, formed or further processed to final articles. The exemplary method comprises the following steps.

Shearing disks from the polarizing film and thermoforming them with the same curvature of the final lens (base 6 or 8).

Treating the disks thermoformed for improving adhesion by a previous immersion in Sodium Methylate solution in Methanol at 30% and, then, into a solution of 2% of a bonding agent like an Alkylaminopropyltrimethoxysilane.

Figure 2:
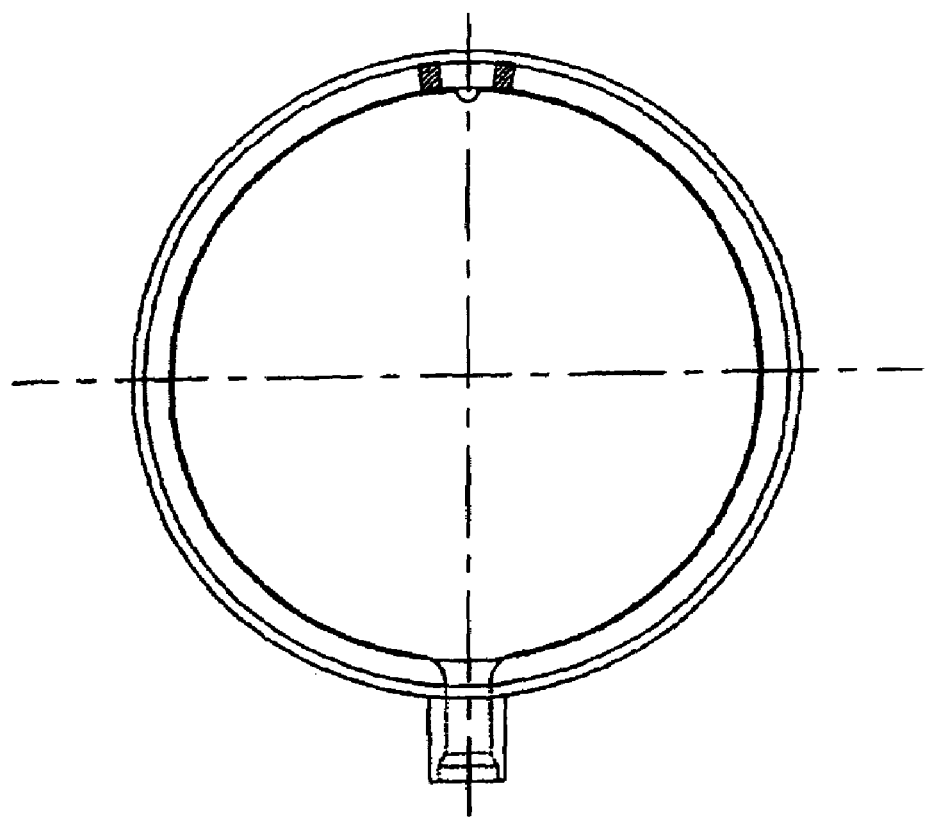
FIG. 2 is a front elevational view of a mold and gasket for manufacturing the lens depicted in FIG. 1.

Inserting the polarizing film disk obtained into a mold attached to a plastic gasket, such as the mold depicted in FIG. 2. The polarizing film disk is positioned nearly equidistant within the optical mold so that the polymeric material may be introduced on both sides of the polarizing disk.

Mixing the prepolymer with a certain percentage of photochromic dye. Generally, the amount of total photochromic compound incorporated into the prepolymer may range from about 0.05 to about 2.0% by weight.

Degassing and mixing the prepolymer and curative rapidly to form a polymeric composition.

Pouring the polymeric composition into the mold so as to cover both sides of the polarizing disk.

Curing the optical part at a appropriate cycle time/temperature. The exemplary sequences for curing optical parts is: Fill cavity of the mold assembly at 60° C. Within 10 minutes (when polymeric material has gelled to inhibit flow during movement), place the mold assembly in an oven at 100 degrees C. Cure in mold assembly for 16–18 hours, then remove the optical part from the assembly The lens obtained after curing and demolding are essentially optically good lenses, highly polarizing and with a strong photochromic activity when exposed to the sunlight.

Importantly, notwithstanding any particular care in positioning the disk, the inventors unexpectedly noted the homogeneity of the resulting lens in which it was nearly impossible to note any evident sign of discontinuity in the material and optical distortions. Further, such lenses can be beveled with a common technique, can be boiled in water without any loss of adhesion and the fatigue of photochromic is very low (less than 20% fatigue after 72 hours Q.Panel testing).

The present invention is more particularly described in the following examples, which are intended as illustrative only, since numerous modifications and variations therein will be apparent to those skilled in the art.

EXAMPLE 1

This example is representative of the manufacturing method described above. The same glass mold used for CR39 casting was assembled with a polarizing wafer disk with the same curvature of the mold. The gasket was properly designed to firmly hold the disk in order to avoid any displacement during the filling.

The correct polarizing axis is identified by means of a notch and the wafer is correctly positioned during the mold assembly.

A prepolymer composition commercially available from Simula Corp. with the trade name SIM 2020 was heated under Nitrogen at 80° C. in a vessel with a proper stirring device.

The combination of photochromic dyes described in table 1 was added and the mixture was allowed to stir to complete solubilisation.

The photochromic prepolymer was then mixed with the proper equivalents of DEDTA at 60° C., introduced into the cavity around the polarizing disk using a RIM machine such as the mixer available from Max Machinery (California, US).

The lens was allowed to solidify at room temperature for about 10 minutes (until mixture gels). The lens was allowed to continue its reactive cure at 100° C. for 16 hours.

TABLE 1

| Photochromic Dye* | Chemical type | Activated color | % by weight |
| --- | --- | --- | --- |
| PPG 33672 | Spiro eterocycle | Blue | 0.07 |
| PPG 5–68 | Etrocycle | Orange | 0.03 |
| Great Lakes Photo SG | Spiro eterocycle | Blue | 0.012 |

*Photochromic dyes obtained from PPG and Great Lakes.

The result was an elastomeric polyurethane lens with the following characteristics:
1) Lighter than the most common optical lenses;
2) More impact resistant than polycarbonate lenses;
3) Polarization degree greater than 99%;
4) Good optical quality due to the high Abbe Number;
5) Photochromic activity greater than 50%; and
7) Possibility to apply any antiscratch and antifog coating and any high vacuum treatment.

A photochromic polarized lens 2.2 mm thick obtained from the previous example, was exposed 60 sec to UVA radiation at 340 nm and a power of 20 W/m2;

| LENS | % TRANSMISSION |
| --- | --- |
| Before UV exposure | 38 |
| After UV exposure | 14 |
| Photochromic Activity* | 63% |

*Photochromic Activity is the drop of Transmission before and after exposure, divided by the Initial Transmission.

To better demonstrate the superiority of such polyurethane lens of the present invention, a comparative table showing the main properties of the most popular optical materials is shown below:

COMPARATIVE TABLE

| Property | CR-39 ® | Polyamide | Polycarbonate | PU |
| --- | --- | --- | --- | --- |
| High Impact Test[1] | Fail | Fail | Pass | Pass |
| Specific Gravity | 1.32 | 1.01 | 1.22 | 1.11 |
| Refractive Index[2] | 1.50 | 1.51 | 1.59 | 1.53 |
| Abbe Number[3] | 58 | 52 | 29 | 45 |

[1]ANSI Z-87.1 High Speed Impact Test, EN 166 standard.
[2]For sun lenses lower value means better optical quality.
[3]Higher value means better optical quality.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between. In particular, this invention should not be construed as being limited to the dimensions, proportions or arrangements disclosed herein.

What is claimed is:

1. An optical part comprising:
a polarizing film covered on both sides by a polyurethanic material comprising a photochromic compound therein.

2. The optical part according to claim 1, wherein the polarizing film comprises a PVA film.

3. The optical part according to claim 1, wherein the polarizing film comprises a PET film.

4. The optical part according to claim 1, further comprising a transparent plastic film laminated on at least one side of the polarizing film.

5. The optical part according to claim 4, wherein the total thickness of the polarizing film and the transparent plastic film is about 0.2 to 0.8 mm thick.

6. The optical part according to claim 5, wherein the transparent plastic film is a cellulose acetate, an acetobutyrrate or a polycarbonate.

7. The optical part according to claim 1, wherein the polarizing film has a degree of polarization of about 90% by European Standard EN 1863.

8. The optical part according to claim 1, wherein the polarizing film is positioned at the center of the part.

9. The optical part according to claim 1, wherein the photochromic compound is selected from the group consisting of naphthopyrans, benzopyrans, indenonaphthopyrans, phenanthorpyrans, spiro(benzindoline)naphthopyrans, spiro(indoline)benzopyrans, spiro(indoline)naphthopyrans, spiro(indoline)quinopyrans, spiro(indoline) pyrans, spiro(indoline)naphthoxazines, spiro(indoline)pyridobenzoxazines, spiro(benzindoline)pyridobenzoxazines, spiro(benzindoline)naphthoxazines, spiro(indoline)benzoxazines, mercury dithizonates, fulgides, fulgimides and mixtures thereof.

10. The optical part according to claim 1, wherein the photochromic compound is an organic photochromic compound having at least one activated absorption maxima within the range of between about 400 and 700 nanometers.

11. The optical part according to claim 1, wherein the polyurethanic material comprises a photochromic amount of the photochromic compound.

12. The optical part according to claim 1, wherein the polyurethanic material comprises about 0.05 to 2.0 percent by weight of photochromic compound.

13. The optical part according to claim 1, further comprising a hard coating layer on at least one side of the part.

14. The optical part according to claim 13, wherein the hard coating layer comprises silica, titania or zirconia, or mixtures thereof.

15. The optical part according to claim 13, wherein the hard coating layer is an organic hard coating material.

16. The optical part according to claim 1, further comprising a tintable coating, an antireflective surface or a hydrophobic coating, or any combination thereof, on at least one side of the optical part.

17. The optical part according to claim 1, further comprising a monolayer or multilayer of metal oxides or metal fluorides deposited on at least one side of the optical part.

18. The optical part according to claim 1, wherein the polyurethanic material is an elastomer resin obtained by the prepolymer method.

19. The optical part according to claim 1, wherein the polyurethanic material additionally comprises one or more of a light stabilizer, heat stabilizers, antioxidant, ultraviolet light absorber, mold release agent, static (non-photochromic) dye, pigment, or a flexibilizing additive.

20. The optical part according to claim 1, wherein the polyurethanic material additionally comprises one or more of an alkoxylated phenol benzoate or a poly(alkylene glycol) dibenzoate.

21. The optical part according to claim 1, wherein the polyurethanic material additionally comprises an antiyellowing additive.

22. The optical part according to claim 21, wherein the antiyellowing additive is 3-methyl-2-butenol, organo pyrocarbonates or triphenyl phosphite.

23. The optical part according to claim 21, wherein the antiyellowing additive is present in an amount totaling about 10% or less by weight.

24. A method of making a photochromic, polarized optical part comprising:
- inserting a polarizing film into a mold,
- introducing a polyurethanic material comprising a photochromic compound therein into the mold so that the polyurethanic material covers both sides of the polarizing film,
- curing the optical part at an appropriate cycle time and temperature, and
- removing the optical part from the mold for additional curing.

25. The method according to claim 24, wherein the polyurethanic material is prepared by rapidly mixing a prepolymer with about 0.05 to 2.0% by weight of a photochromic compound, and degassing the mixture to form the polyurethanic material.

* * * * *